(12) United States Patent
Guo et al.

(10) Patent No.: US 9,906,057 B2
(45) Date of Patent: Feb. 27, 2018

(54) MODULAR MULTILVEL CONVERTER AND CONTROL FRAMEWORK FOR HYBRID ENERGY STORAGE

(71) Applicant: NEC Laboratories America, Inc., Princeton, NJ (US)

(72) Inventors: Feng Guo, Columbus, OH (US); Yanzhu Ye, San Jose, CA (US); Ratnesh Sharma, Fremont, CA (US)

(73) Assignee: NEC Corporation (JP)

( * ) Notice: Subject to any disclaimer, the term of this patent is extended or adjusted under 35 U.S.C. 154(b) by 358 days.

(21) Appl. No.: 14/878,817

(22) Filed: Oct. 8, 2015

(65) Prior Publication Data

US 2016/0105020 A1   Apr. 14, 2016

Related U.S. Application Data

(60) Provisional application No. 62/061,717, filed on Oct. 9, 2014.

(51) Int. Cl.
*H02J 1/00* (2006.01)
*H02J 7/00* (2006.01)
*H02J 3/32* (2006.01)
*H02J 7/34* (2006.01)
*H02M 1/00* (2006.01)
*H02M 7/483* (2007.01)

(52) U.S. Cl.
CPC .............. *H02J 7/0054* (2013.01); *H02J 3/32* (2013.01); *H02J 7/345* (2013.01); *H02J 2007/0059* (2013.01); *H02M 2001/0003* (2013.01); *H02M 2007/4835* (2013.01)

(58) Field of Classification Search
USPC ........................................... 307/87
See application file for complete search history.

(56) References Cited

PUBLICATIONS

Ciccarelli, et al., "Energy Storage Management Control based on Supercapacitors using a Modular Multilevel Inverter Topology for Electrical Vehicles", International Conference on Clean Electrical Power (ICCEP), Jun. 2013, pp. 170-176.
Glinka, et al., "A New AC/AC Multilevel Converter Family", IEEE Transactions on Industrial Electronics, Jun. 2005, pp. 662-669, vol. 52, No. 3.
Feng, et al.,"Hybrid Energy Storage With Multimode Fuzzy Power Allocator for PV Systems", IEEE Transactions on Sustainable Energy, Apr. 2014, pp. 389-397, vol. 5, No. 2.

*Primary Examiner* — Rexford Barnie
*Assistant Examiner* — Dru Parries
(74) *Attorney, Agent, or Firm* — Joseph Kolodka

(57) ABSTRACT

A modular multilevel converter for hybrid energy storage includes three phases connectable in series to a battery, and in parallel to one another. Each phase includes at least two arms of sub-modules and buffer inductors, and each of the sub-modules comprises a half-bridge and an ultracapacitor. A two layer controller, including a coordination layer and a converter layer, is configured to independently control battery output power and ultracapacitor output power, and to distribute a power load between the battery and the ultracapacitor to optimize the performance of a hybrid energy storage system.

17 Claims, 9 Drawing Sheets

MODULAR MULTILVEL CONVERTER AND CONTROL FRAMEWORK FOR HYBRID ENERGY STORAGE

RELATED APPLICATION INFORMATION

This application claims priority to provisional application Ser. No. 62/061,717 filed on Oct. 9, 2014, incorporated herein by reference.

BACKGROUND

Technical Field

The present invention relates to management of energy storage systems, and, more particularly, to a modular multilevel converter and control framework for management of hybrid energy storage systems.

Description of the Related Art

With high penetrations of Photovoltaic (PV) systems in the power grid, short-term, high-frequency fluctuation of the PV output power during unpredictable weather variations is increasingly becoming a concern. To support the penetration of renewable energy generation in the power grid and to provide ancillary functions for system operation (e.g., compensate for the fluctuation), the demand for energy storage systems (ESSes), which may store a large amount of energy and provide high charging/discharging power as needed, has increased. However, single type energy storage elements cannot store a large amount of energy and provide high charging/discharging power, and as such, hybrid ESSs (HESSs) have been employed to utilize the advantages of different energy storage elements to provide a solution for this issue.

Batteries have a relatively large energy density and UCs have a large power density. By combining them together, the HESS can satisfy all the power requirements to smooth the PV output power. Furthermore, the UC can alleviate the high power burden on the battery, extend the battery lifetime, and reduce the size and power loss of the battery.

Conventional HESSs with a battery and a UC generally employ a two-stage configuration, which includes a dc/dc converter and a dc/ac inverter. The addition of a dc/dc converter increases the system cost, and also introduces extra power loss. Furthermore, with the increased power and energy ratings of the HESS for utility-level applications, the power semiconductor devices and passive components in these topologies may become unsuitable to handle the high voltage and current presented in the system.

SUMMARY

A modular multilevel converter for hybrid energy storage includes three phases connectable in series to a battery, and in parallel to one another. Each phase includes at least two arms of sub-modules and buffer inductors, and each of the sub-modules comprises a half-bridge and an ultracapacitor. A two layer controller, including a coordination layer and a converter layer, is configured to independently control battery output power and ultracapacitor output power, and to distribute a power load between the battery and the ultracapacitor to optimize the performance of a hybrid energy storage system.

A method for controlling a modular multilevel converter based hybrid energy storage system, including determining a number ($n_P$ and $n_N$) of sub-modules to be inserted in a respective upper and lower arm of a phase in the modular multilevel converter, and determining whether a current in each respective arm is greater than zero. Sub-modules to engage for each arm are selected based on ultracapacitor voltages for each sub-module in the respective arm in accordance with the determination of whether the current in the respective arm is greater than zero, and gate signals are generated to engage the selected sub-modules. Power is distributed based on a two layer controller including a coordination layer and a converter layer. The two layer controller independently controls battery output power and ultracapacitor output power, and distributes a power load between a battery and an ultracapacitor to optimize the performance of the hybrid energy storage system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide a system and method for managing hybrid energy storage systems (HESSs) using a modular multilevel converter and control framework, in accordance with various embodiments of the present principles. In a particularly useful embodiment, a Modular Multilevel Converter (MMC) (which combines a battery and an UltraCapacitor (UC)), and a two-layer framework may be employed to control HESSs.

Compared to conventional MMCs, embodiments of the present principles may have different principles of operation. Because of the integrated energy storage element, the average active power of each sub-module is not necessarily equal to zero and the power from the DC side is not necessarily equal to the alternating current (AC) side. Because the voltage of the UC changes with the state of charge (SoC), and because there is no DC/DC stage in each sub-module, the sum of UC voltages in one arm will not necessarily be equal to the battery voltage at a DC bus. In one embodiment, the MMC according to the present principles may be employed for high power battery/UC HESSs. Half bridges integrated with low voltage UC modules may be utilized as a sub-module (SM) of a converter, and a high-voltage battery pack may be placed at a DC bus.

Moreover, as compared to conventional HESS topologies, the MMC according to the present principles may include the following features: (1) a direct dc/ac conversion may be realized (e.g., increasing overall system efficiency); (2) eliminating the dc inductor and greatly reducing the size of the dc-link capacitor (e.g., reducing the cost of dc side passive components) by, for example, 50% or more; (3) the modular structure of the converter is advantageous for controlling grid energy storage systems with large voltage and power ratings; (4) eliminating the dc/dc stage in the SMs (e.g., greatly reducing the number of switches and passive components); and (5) reducing the voltage and current rating for a single device (e.g., enabling usage of low cost and high performance switching devices even if a total number of switches is increased) according to various embodiments.

Figure 1:
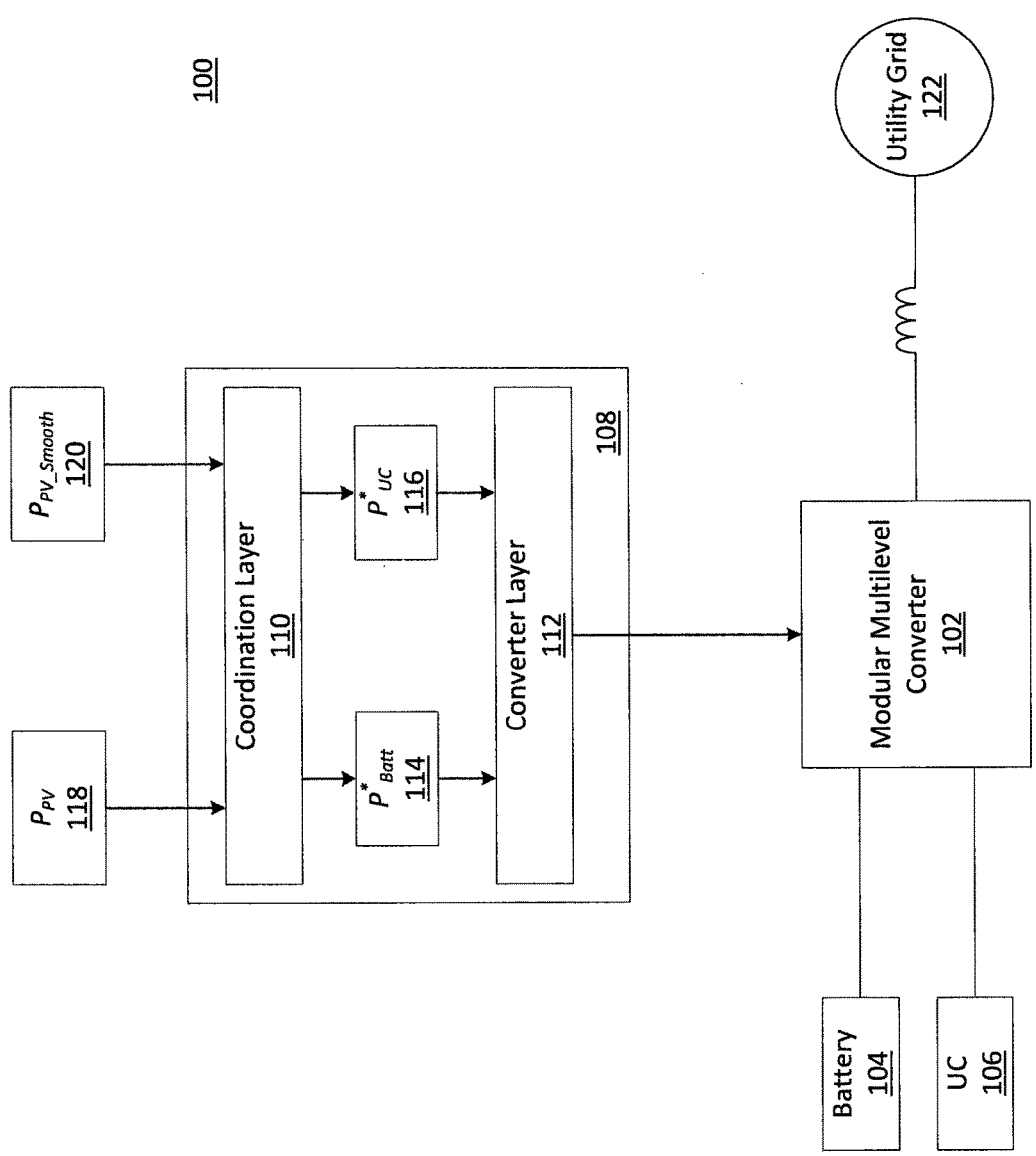
FIG. 1 shows an exemplary high-level schematic of a hybrid energy storage system (HESS) including a modular multilevel converter and multilayer controller, in accordance with one embodiment of the present principles.

Referring now to the drawings in which like numerals represent the same or similar elements and initially to FIG. 1, an exemplary high-level schematic of a hybrid energy storage system 100 (HESS) including a modular multilevel converter and multilayer controller is illustratively depicted in accordance with one embodiment of the present principles. In one embodiment, a two-layer control framework 108 (e.g., coordination layer 110 and control layer 112) may be employed to control the MMC 102 based HESS 100 (e.g., for PV applications) connected to a utility grid 122 according to the present principles. At the coordination layer 110, a fuzzy logic based power distribution method may be implemented to share the load between the battery 104 and the UC 106. At the converter layer 112, a control method which may independently control the power from the battery 104 and the UC 106 may be employed according to the present principles.

In one embodiment, the two-layer control framework 108 may receive actual power 118 (e.g., actual photovoltaic (PV) power) and smoothed power 120 (e.g., smoothed PV power) as input. In one embodiment, battery power 114 may be directly determined in the coordination layer 110 (e.g., fuzzy logic controller), and the UC power 116 may be determined by subtraction of battery power 114 from requested output power for the HESS 100 according to the present principles. The MMC 102 and the two-layer control framework 108 will be described in further detail herein below.

Figure 2:
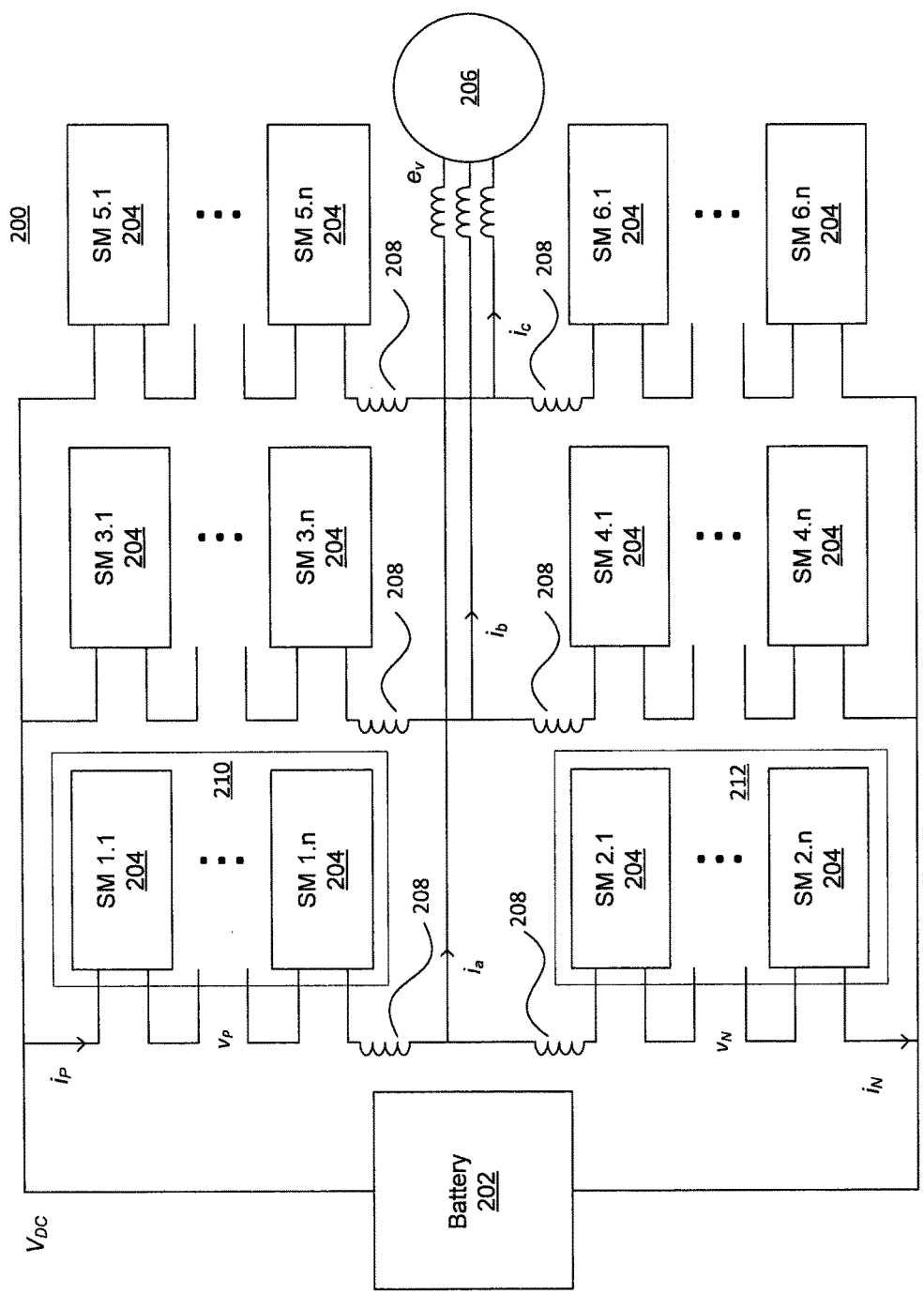
FIG. 2 shows an exemplary schematic of a modular multilevel converter, in accordance with one embodiment of the present principles.

Referring now to FIG. 2, an exemplary schematic of a modular multilevel converter 200 (MMC) is illustratively depicted in accordance with one embodiment of the present principles. In one embodiment, a battery 202 is connected in serial with groups of sub-modules 204. The battery 202 may be a high-voltage battery pack that may include multiple individual cells. Each group of sub-modules 204 may include n sub-modules, each arranged in serial and connected to a utility grid 206. Half of the sub-modules 204 (e.g., those shown as 1.x, 3.x, and 5.x) may be connected to the positive terminal of the battery 202, while the other half of the sub-modules 204 (e.g., those shown as 2.x, 4.x, and 6.x) may be connected to the negative terminal of the battery 102 according to the present principles. In one embodiment, an upper arm of sub-modules is represented in block 210 and a lower arm of sub-modules is represented in block 212.

In one embodiment, the MMC 200 may include three phases (e.g., sub-modules 1.x and 2.x, sub-modules 3.x and 4.x, and sub-modules 5.x and 6.x). In each phase, two identical strings of sub-modules 204 may be included with one buffer inductor 208. Each of the phases may produce one output that goes to the utility grid 206.

In one embodiment, the UC voltages for each SM may be equivalent, and thus, a total output voltage of all SMs 204 in each arm 210, 212 may be expressed as follows:

$$v_P = n_P v_{CP}, \quad v_N = n_N v_{CN}, \tag{1}$$

where $n_P$ and $n_N$ are inserted numbers of SMs in the upper arm 210 and the lower arm 212, respectively, of one or more SMs. In addition, based on Kirchhoff's Voltage Law (KVL), $v_P$ and $v_N$ may be expressed as follows:

$$\begin{cases} v_P = \dfrac{V_{DC}}{2} - R_c i_P - L_c \dfrac{di_P}{dt} - v_{an} - v_{cm} \\ v_N = \dfrac{V_{DC}}{2} - R_c i_N - L_c \dfrac{di_N}{dt} - v_{an} + v_{cm} \end{cases}, \tag{2}$$

where $i_P$ and $i_N$ are the upper arm 210 and lower arm 212 current, respectively. $R_C$ and $L_C$ are the resistance and inductance of a buffer inductor, respectively. $v_{an}$ is the phase output voltage, and $v_{cm}$ is the common mode voltage. For simplicity of illustration, it is assumed that $v_{cm}=0$ in this embodiment. The circulating current $I_{circ}$ may be defined as follows:

$$i_{circ} = \dfrac{i_P + i_N}{2} = I_{circ} + \hat{i}_{circ}, \tag{3}$$

where $I_{circ}$ and $\hat{i}_{circ}$ are the dc and ac components of the circulating current, respectively.

In one embodiment, in the MMC 200, $I_{circ}$ may be directly related to the dc bus current, which may be the battery current in this example. $I_{circ}$ may be separated from the circulating current in some embodiments, and may be directly defined as $$\dfrac{I_{dc}}{3},$$

assuming for simplicity of illustration that the dc current is evenly distributed in the three phases. Further assuming that the output phase current is evenly distributed between the upper arm 210 and the lower arm 212, the arm currents may be expressed as follows:

$$i_P = \dfrac{i_a}{2} + i_{circ}, \quad i_N = -\dfrac{i_a}{2} + i_{circ}, \tag{4}$$

where $i_a$ is the phase output current.

Figure 3:
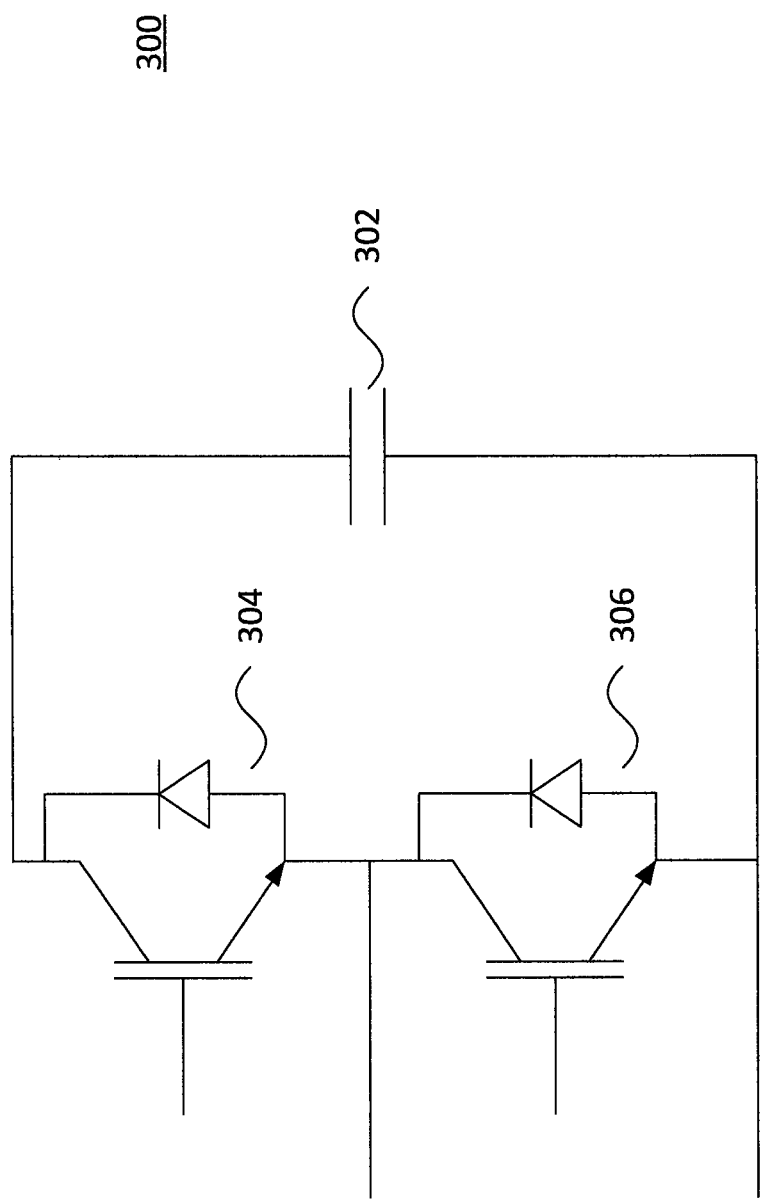
FIG. 3 shows an exemplary schematic of a sub-module of a modular multilevel converter, in accordance with one embodiment of the present principles.

Referring now to FIG. 3, with continued reference to FIG. 2, an exemplary schematic of an individual sub-module 300 of a modular multilevel converter is illustratively depicted in accordance with one embodiment of the present principles. In one embodiment, a low-voltage UC 302 may be employed with two semiconductor switches 304 and 306. The semiconductor switches 304 and 306 may be, for example, an insulated-gate bipolar transistor (IGBT) or a metal-oxide semiconductor field-effect transistor (MOSFET).

In one embodiment, when the upper switch 304 is on, the sub-module 204 may be inserted into the circuit and the output voltage may be the UC 302 voltage. In one embodiment, when the lower switch 306 is on, the sub-module 204 may be bypassed from the circuit and the output voltage may be zero. The use of a half bridge in the sub-modules 204 may reduce the number of semiconductor switches and passive components in the MMC 200, and may increase the efficiency of the whole system according to various embodiments of the present principles. Although the above circuit topology is presented for illustrative purposes, it is noted that the converter and/or controller may be employed for any type of circuit according to various embodiments of the present principles.

Figure 4:
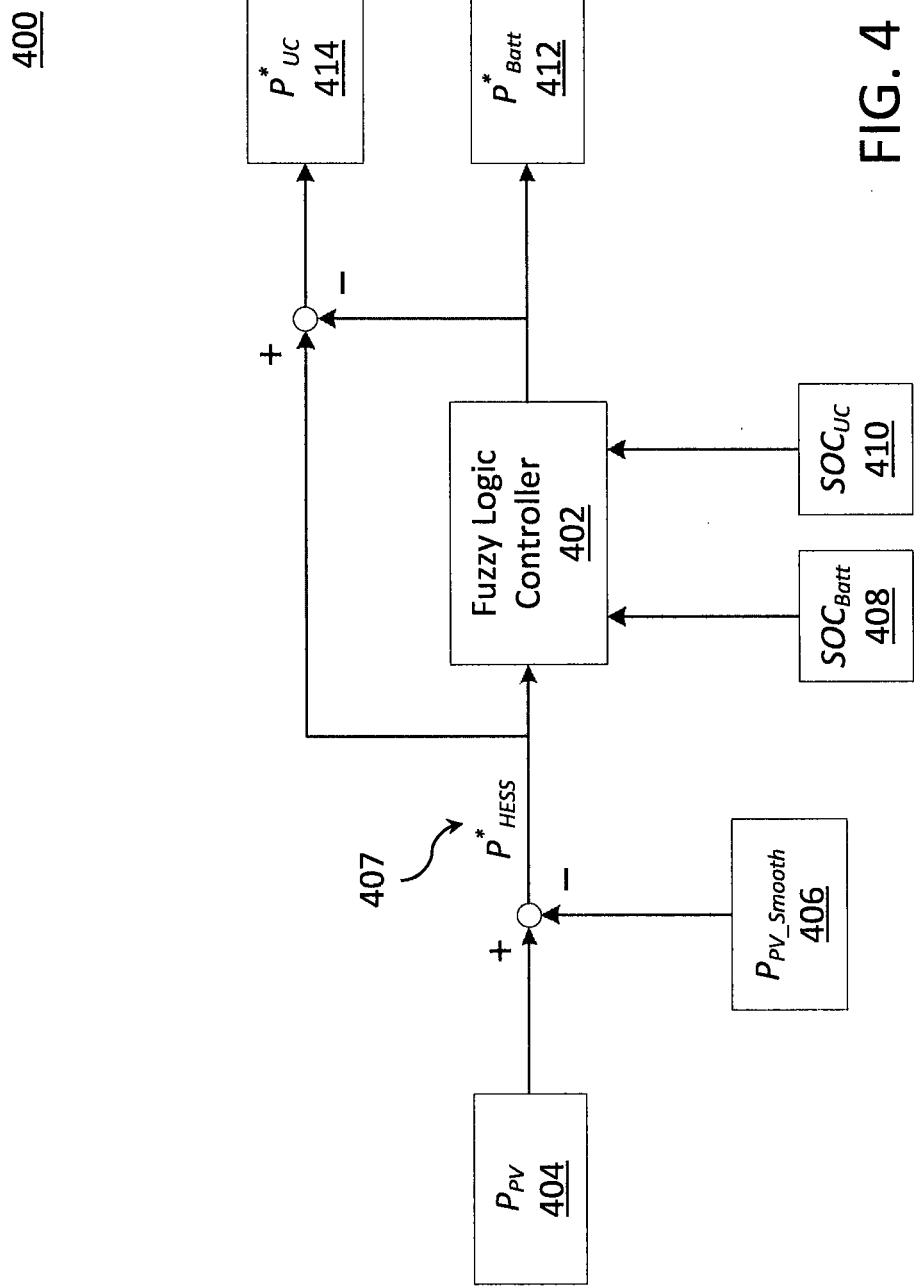
FIG. 4 shows an exemplary system/method for distribution of power using a fuzzy logic controller, in accordance with one embodiment of the present principles.

Referring now to FIG. 4, with continued reference to FIG. 1, an exemplary system/method 400 for distribution of power using a fuzzy logic controller 402 is illustratively depicted in accordance with one embodiment of the present principles. In one embodiment, there may be two layers of control methods in the control framework 108. At the coordination layer 110, a fuzzy logic based method may be implemented using a fuzzy logic controller 402 to determine the power distribution between the battery 104 and the UC 106. At the converter layer 112, the battery power and output power may be controlled independently, so the power from the battery 104 and UC 106 can be controlled separately, according to various embodiments of the present principles.

In one embodiment, the requested HESS output power 407 that may be received as input to the fuzzy logic controller 402 may be the difference between the actual PV power 404 and the smoothed PV power 406. To utilize the different characteristics of the battery and the UC, the fuzzy logic controller 402 may be implemented at the coordination layer 110 and may be employed to distribute power between storage elements (e.g., battery and UC) according to the present principles.

In various embodiments, the smoothed PV power 406 may be obtained from different methods (e.g., a constant value, a low-pass filtered value of the actual PV power, etc.). The battery power 412 may be directly regulated by the fuzzy logic controller 400, since the battery charging and discharging power can greatly affect its life cycle and may be more constrained (e.g., as compared to the UC). The UC power 414 may then be determined by the subtraction of battery power 412 from the requested HESS output power 407. As such, the fuzzy logic controller 402 may control both battery and UC power of the HESS to ensure that both battery and UC operate in the safety region. Furthermore, the controller 402 can intelligently distribute the power between the battery and UC, such that the battery outputs baseline power with a pre-calculated/user-defined dynamic low peak value, and the ultracapacitor outputs fluctuating power with a pre-calculated/user-defined dynamic high peak value.

In one embodiment, the fuzzy logic controller 402 may take the State of Charge (SOC) of the battery 408, SOC of the UC 410, and/or the requested HESS output power 407 as input variables. The controller 402 may be designed based on the selection of fuzzy rules, as well as the number and shape of the membership functions of each fuzzy variable, examples of which are shown in FIG. 5.

In some embodiments according to the present principles, the fuzzy rules for the fuzzy controller 402 may be designed and/or enforced as follows: (1) the battery provides a low and smooth power supply; (2) the battery is acting as a complementary energy resource to help regulate the UC SOC when it is approaching the predefined boundary; and (3) the UC shares more power when its SOC located in normal region to relieve the battery from high power demands, which may be different on a case by case basis. The fuzzy logic controller 402 may be employed to intelligently distribute power between the battery and the UC, thereby enabling optimal battery operation conditions and extending battery life according to the present principles. The fuzzy logic controller 402 may be implemented in a two layer controller, which may include a coordination layer 110 and a converter layer 112 according to one embodiment.

Figure 5:
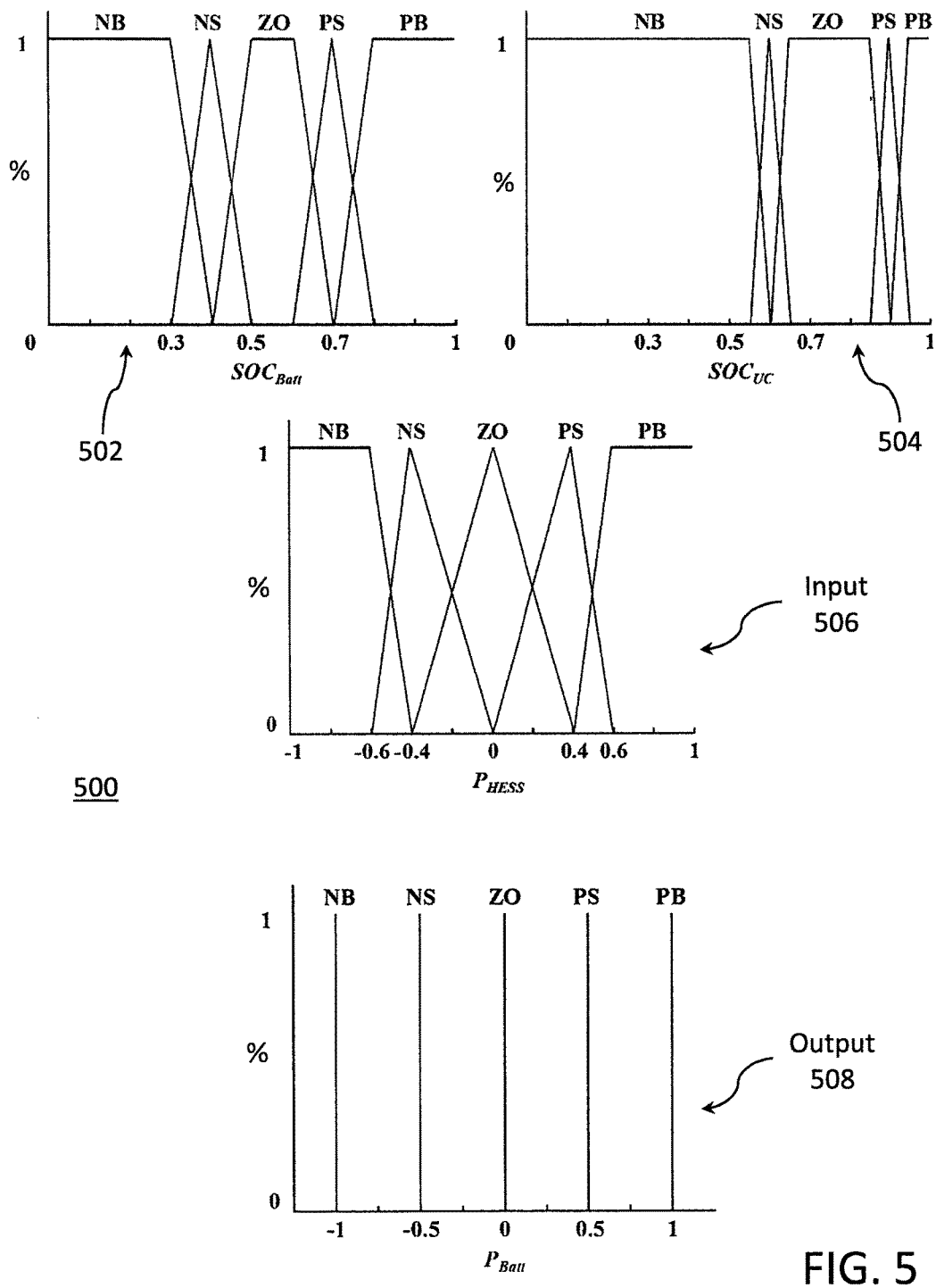
FIG. 5 shows exemplary graphs of membership functions of a fuzzy logic controller, in accordance with an embodiment of the present principles.

Referring now to FIG. 5, with continued reference to FIG. 4, exemplary graphs 500 of membership functions of a fuzzy logic controller are illustratively depicted in accordance with an embodiment of the present principles. The graphs 500 include a SOC graph for the battery 502, a SOC graph for the UC 504, an input graph for the power in the HESS 506, and an output graph for the power in the battery 508 according to various embodiments.

In one embodiment, based on fuzzy logic rules employed by the fuzzy logic controller 402, various input and/or output membership functions may be represented, and fuzzy variables may be expressed as, for example, the following linguistic variables: Positive Big (PB), Zero (ZO), Negative Big (NB), and/or Negative Small (NS). The negative sign (−) is for charging, while the positive sign (+) is for discharging. Since the UCs need to maintain enough voltage for power delivery, the lower limit of the SOC of the UC is higher than 0.5 (50%) in some embodiments.

As in illustrative example, the exemplary rules when the SOC of the battery is located in the ZO region are shown below in Table 1.

TABLE 1

Examples of Fuzzy Rules

| $P_{HESS}$ | PB | PS | ZO | NS | NB |
|---|---|---|---|---|---|
| PB | ZO | ZO | NB | NB | NB |
| PS | ZO | ZO | NS | NS | NS |
| ZO | ZO | ZO | ZO | ZO | ZO |
| NS | PS | PS | PS | PS | ZO |
| NB | PB | PB | PB | PS | ZO |

In some embodiments, the generated HESS output power, battery reference power, and UC reference power may be directly sent to the converter layer after each calculation step, and will be described in further detail herein below with reference to FIG. 6, in which the system may be repeatedly running with a fixed time step according to the present principles.

Figure 6:
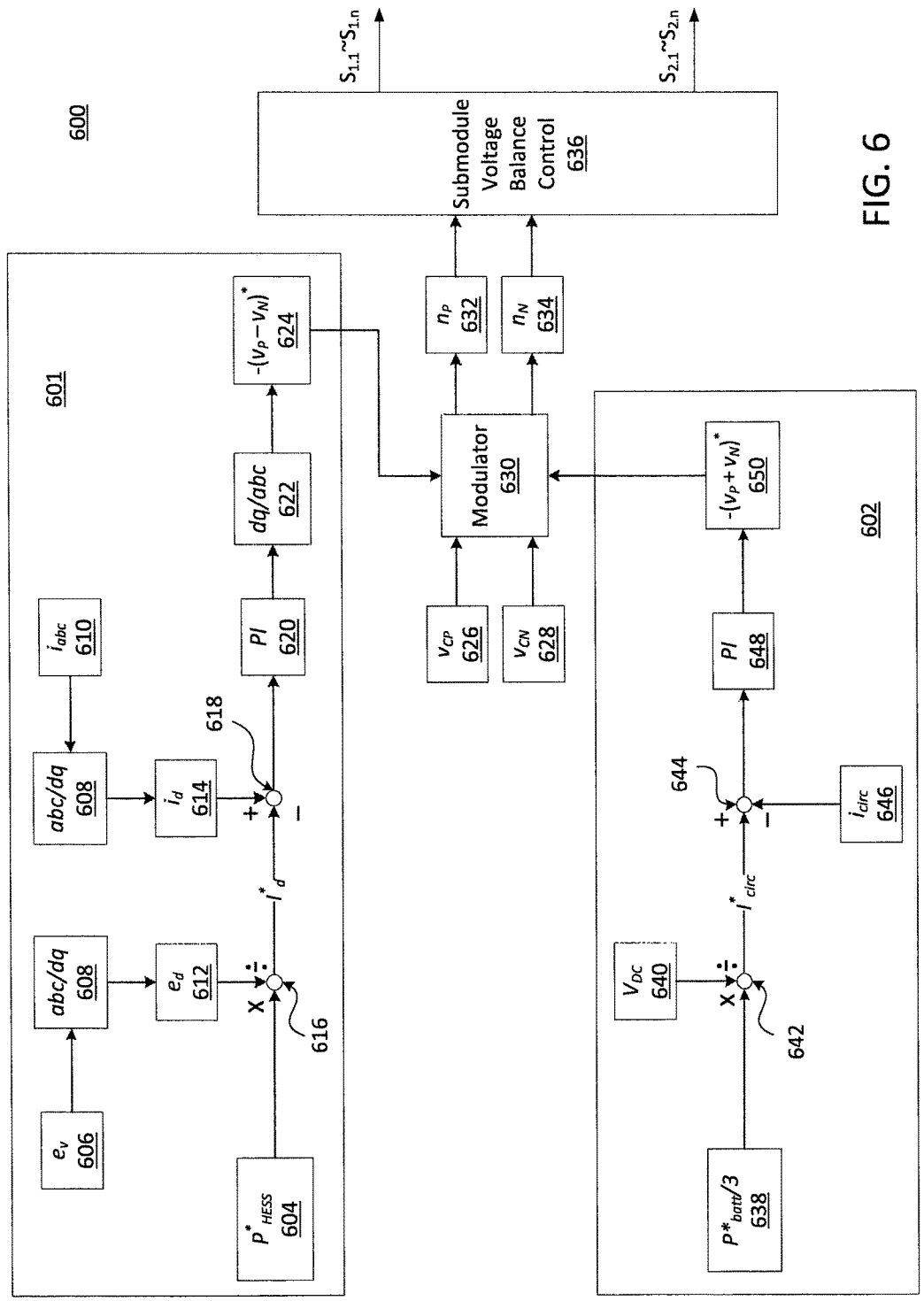
FIG. 6 shows a diagram of a controller for a modular multilevel converter, in accordance with an embodiment of the present principles.

Referring now to FIG. 6, with continued reference to FIG. 2, a diagram of a converter layer controller 600 for a modular multilevel converter is illustratively depicted in accordance with an embodiment of the present principles. In one embodiment, because all three phases are symmetric, only one such control phase is shown for simplicity of illustration. In one embodiment, circulating current $i_{circ}$ and output current $i_{abc}$ may be controlled independently, so the power from the battery and UC can also be controlled independently. There may be four main components in the controller, including, for example, a battery power controller 602 and an output power controller 601 (e.g., high level control), a modulator 630 (e.g., hardware modulator), and/or a SM voltage balance controller 636 (e.g., low level control)

according to various embodiments of the present principles. In one embodiment, based on the power needed from the battery and the UC, the number of sub-modules inserted into the upper and lower arm of the MMC 200 (e.g., $n_P$ 632 and $n_N$ 634) at any given time may be derived in the controller 600 according to the present principles.

In one embodiment, in the output power controller 601, a three-phase voltage $e_v$ 606 may be fed to an abc/dq converter 608, which may convert the three-phase voltage from abc into dq0, and an output power reference may be provided from block 604. After transformation, the 'd' axis component of the three-phase voltage $e_d$ 612 may be used to divide an output power reference $P_{out}$ in a divider 616 to produce a 'd' axis component of three-phase output current reference $I_d$. A three-phase output current $i_{abc}$ 610 may be supplied to an abc/dq converter 608 to convert the current into dq0 coordinates.

After transformation, the 'd' axis component of the three-phase current $i_d$ 614 may be subtracted from the three-phase output current reference $I_d$ 614 at a combiner 618, the output of which may be provided to a proportional-integral (PI) controller 620. The output of the PI controller 620 may be passed to a dq/abc converter 622 to produce an output-power-related voltage reference in abc coordinates in block 624, which may be the difference between the lower arm output voltage $v_n$ and the upper arm output voltage $v_p$, which may be sent to the modulator 630.

In one embodiment, in the battery power controller 602, a battery power reference $$\frac{P_{batt}}{3} \, 638$$

may be provided to a divider 642, where it is divided by a DC bus voltage $V_{DC}$ 640, which is also the battery voltage, to find a reference for the circulating current $I_{circ}^*$. In the meantime, the actual circulating current $i_{circ}$ 646 may be feedback to the controller 602, and may be defined as $$i_{circ} = \frac{i_P + i_N}{2},$$

where $i_p$ is the current in the upper arm of the MMC 200 and $i_N$ is the current in the lower arm of the MMC 200. The circulating current $i_{circ}$ 646 may be subtracted from $I_{circ}^*$ at a combiner 644, and may be processed at PI block 648 to produce output in block 650, which may be the reference for the sum between upper arm output voltage $v_p$ and lower arm output voltage $v_n$, which may be sent to the modulator 630 according to one embodiment of the present principles.

In one embodiment, the output power-related voltage (e.g., difference voltage) from block 624, the battery power-related voltage (e.g., sum voltage) from block 650, the upper arm UC voltage $V_{CP}$ from block 626, and the lower arm UC voltage $V_{CN}$ may be received as input to a modulator 630 to generate an inserted number of SMs for the upper arm $n_P$ in block 632 and the lower arm $n_N$ in block 634 according to the present principles. This relationship may be represented by $$n_P = \frac{v_P^*}{v_{CP}}, n_N = \frac{v_N^*}{v_{CN}}.$$

In one embodiment, the SM voltage balance controller 636 may receive the inserted numbers of SMs for the upper arm 632 and the lower arm 634 from the modulator 630. The controller 636 may perform voltage balancing between SMs so that each UC in the same arm of the MMC 200 shares the same voltage, as well as generating gate signals according to the present principles. The voltage balance control method will be described in further detail herein below with reference to FIG. 7.

In one embodiment, the controllers 601, 602 in the converter layer 600 may generate a desired number of inserted SMs in blocks 632 and/or 634 based on requested HESS output power 604, battery reference power 638, and UC reference power (not shown). The HESS output power 604 may be controlled by regulating the output current, and the battery power may be controlled by regulating the circulating current in various embodiments. For simplicity of illustration, the power loss in the circuit may be ignored, and the UC power may be controlled indirectly according to the following:

$$P_{UC} = P_{HESS} - P_{batt} \quad (5)$$

In one embodiment, when deriving equations for output current and circulating current, the following relationship may exist:

$$v_{an} = R_f i_a + L_f \frac{di_a}{dt} - e_v, \quad (6)$$

where $e_v$ is the grid voltage or the back emf of the load, and $R_f$ and $L_f$ are the resistance and inductance of the filter inductor, respectively. Equations (2), (4), and (6) may be combined to transform the input data to generate the output current and circulating current as follows:

$$\begin{cases} \left(L_f + \frac{L_c}{2}\right)\frac{di_a}{dt} = -\left(R_f + \frac{R_c}{2}\right)i_a - \frac{v_P - v_N}{2} - e_v \\ L_c \frac{di_{circ}}{dt} = -R_c i_{circ} - \frac{v_P + v_N}{2} + \frac{V_{DC}}{2} \end{cases} \quad (7)$$

In one embodiment, based on equation (7), the controls of the output current and circulating current are decoupled (e.g., battery power may be controlled independently from HESS output power 604). Therefore, in some embodiments, the output current may only be related to the differential mode voltage 624 of $v_P$210 and $V_N$212, and the circulating current may only be related to the common mode voltage of $v_P$ 210 and $v_N$ 212 according to the present principles.

In one embodiment, based on equation (7), an open loop transfer function from $(v_P - V_N)$ in block 624 to $i_a$ may be defined as follows:

$$G_a = \frac{1}{(2L_f + L_c)s + (2R_f + R_c)}, \quad (8)$$

where $G_a$ represents an open loop transfer function. The control of the HESS output power 604 may be performed in a rotating reference frame, and a PI controller 620 may be selected for controlling the power according to the present principles, and may be a closed loop control. In one embodiment, an open loop transfer function from $(v_P + V_N)$ in block 650 to $i_{circ}$ may be defined as follows:

$$G_{circ} = \frac{1}{(2L_c s + R_c)} \quad (9)$$

The control of the battery power 638 may be performed using a PI controller 648, and may be a closed loop control according to various embodiments.

In one embodiment, after $v_P$ and $v_N$ are determined (e.g., based on measured UC voltages), the inserted number of SMs may be determined using equation (1) according to the present principles. The converter layer 600 may perform active sorting and/or selection so that the UC in each SM shares the same voltage. At each time step if the arm current is charging, the first n SMs with the lowest voltages may be inserted. Correspondingly, if the arm current is discharging, the first n SMs with the highest voltages may be inserted according to various embodiments of the present principles. The active sorting and selection will be described in further detail herein below.

Figure 7:
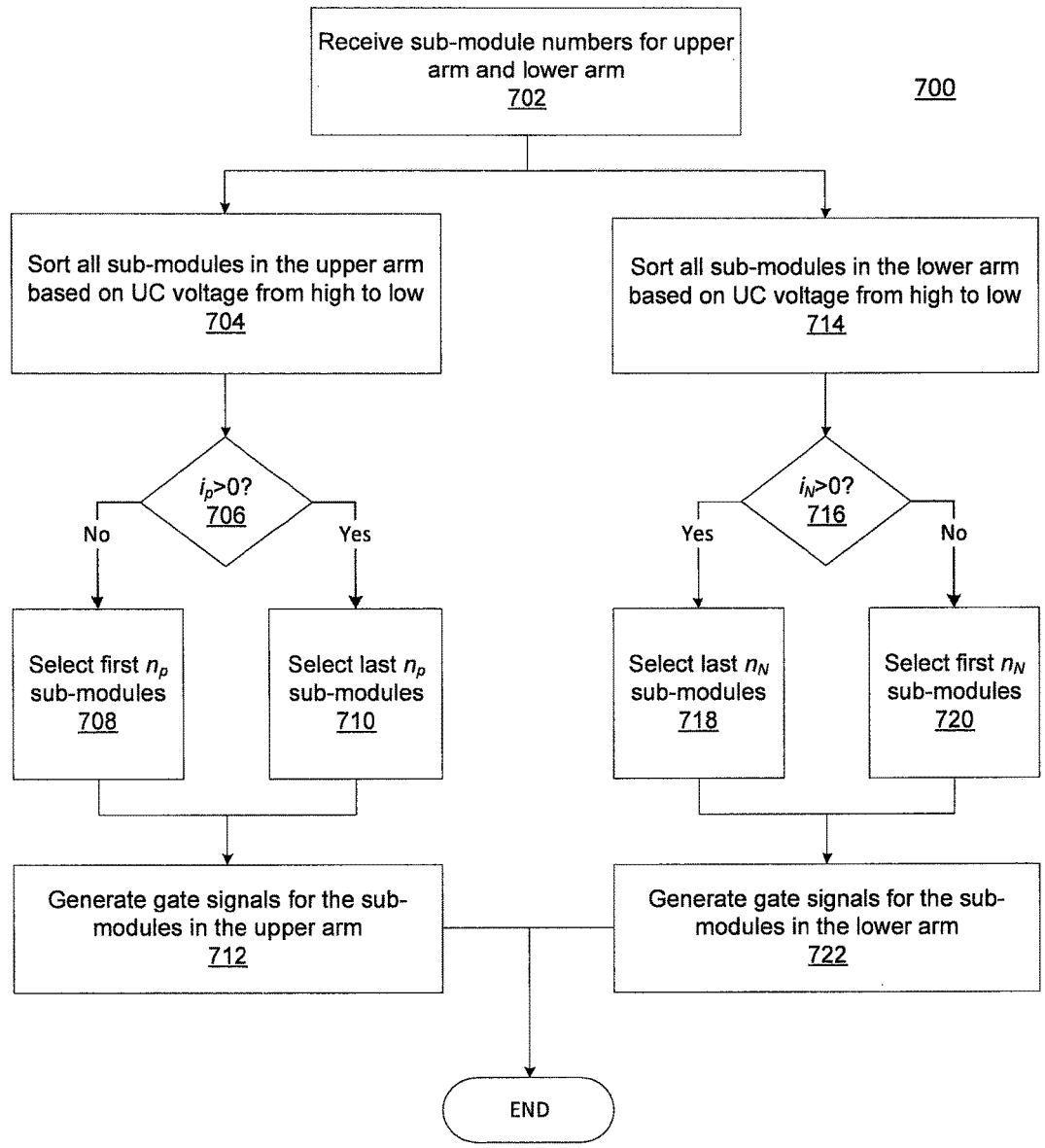
FIG. 7 shows an exemplary method for controlling sub-module voltage, in accordance with an embodiment of the present principles.

Referring now to FIG. 7, with continued reference to FIGS. 2 and 6, an exemplary method 700 for controlling sub-module voltage using a sub-module voltage balance controller 636 is illustratively depicted in accordance with an embodiment of the present principles. In one embodiment, the SM voltage balance controller 636 may receive the inserted numbers of SMs for the upper arm 632 and lower arm 634 for the MMC 200 from the modulator 630 in block 702.

In one embodiment, separate branches may handle the consideration of the respective arms. For the upper-arm branch 210, block 704 may sort all sub-modules 204 in the upper arm by UC voltage from high to low. Block 706 may determine whether the upper arm current $i_P$ is greater than zero. If so, block 708 may select the last $n_P$ sub-modules 204 (e.g., those with the lowest UC voltages). If not, block 710 may select the first $n_P$ sub-modules 204 (e.g., those with the highest UC voltages). Block 712 may then generate gate signals for the sub-modules 204 in the upper arm 210 according to one embodiment of the present principles.

In one embodiment, a similar process is used for the lower-arm branch 212. Block 714 may sort all of the sub-modules 204 in the lower arm 212 by UC voltage from high to low. Block 716 may determine whether the lower arm current $i_N$ is greater than zero. If so, block 718 selects the last $n_N$ sub-modules 204 (e.g., those with the lowest UC voltages). If not, block 720 may select the first $n_N$ sub-modules 504 (e.g., those with the highest UC voltages). Block 722 may then generate gate signals for the sub-modules 504 in the lower arm 212 according to one embodiment of the present principles.

Figure 8:
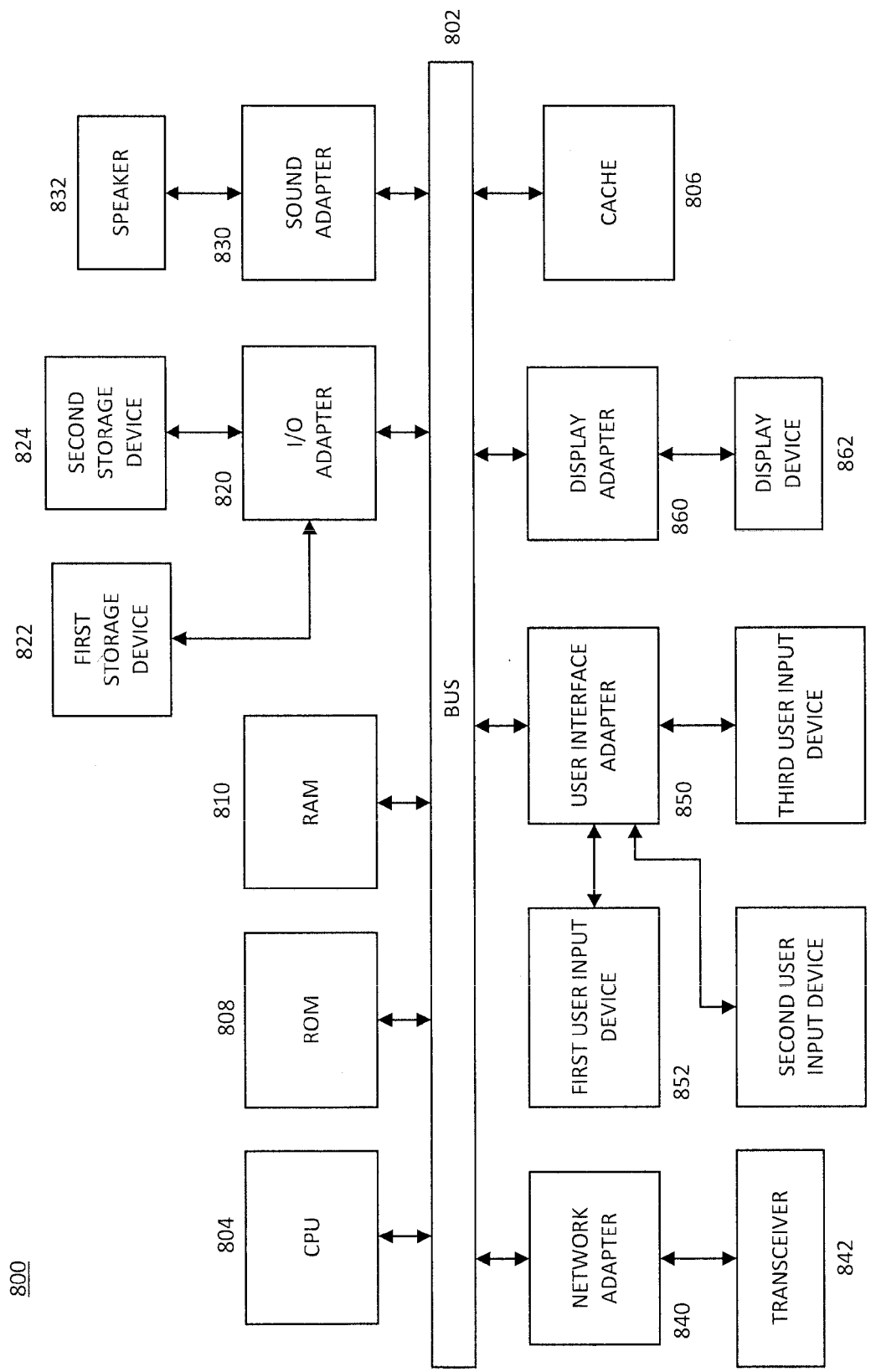
FIG. 8 shows an exemplary processing system to which the present principles may be applied, in accordance with an embodiment of the present principles.

Referring now to FIG. 8, an exemplary processing system 800, to which the present principles may be applied, is illustratively depicted in accordance with an embodiment of the present principles. The processing system 800 includes at least one processor (CPU) 804 operatively coupled to other components via a system bus 802. A cache 106, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 102.

A first storage device 822 and a second storage device 824 are operatively coupled to system bus 802 by the I/O adapter 120. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that circuits/systems 100, 200, 300, 400, 600, and 900 described below with respect to FIGS. 1, 2, 3, 4, 6, and 9 are circuits/systems for implementing respective embodiments of the present principles. Part or all of processing system 800 may be implemented in one or more of the elements of systems 100, 200, 300, 400, 600, and 900 with respect to FIGS. 1, 2, 3, 4, 6, and 9.

Further, it is to be appreciated that processing system 800 may perform at least part of the methods described herein including, for example, at least part of method 700 of FIG. 7. Similarly, part or all of circuits/systems 100, 200, 300, 400, 600, and 900 of FIGS. 1, 2, 3, 4, 6, and 9 may be used to perform at least part of the methods described herein including, for example, at least part of method 700 of FIG. 7.

Figure 9:
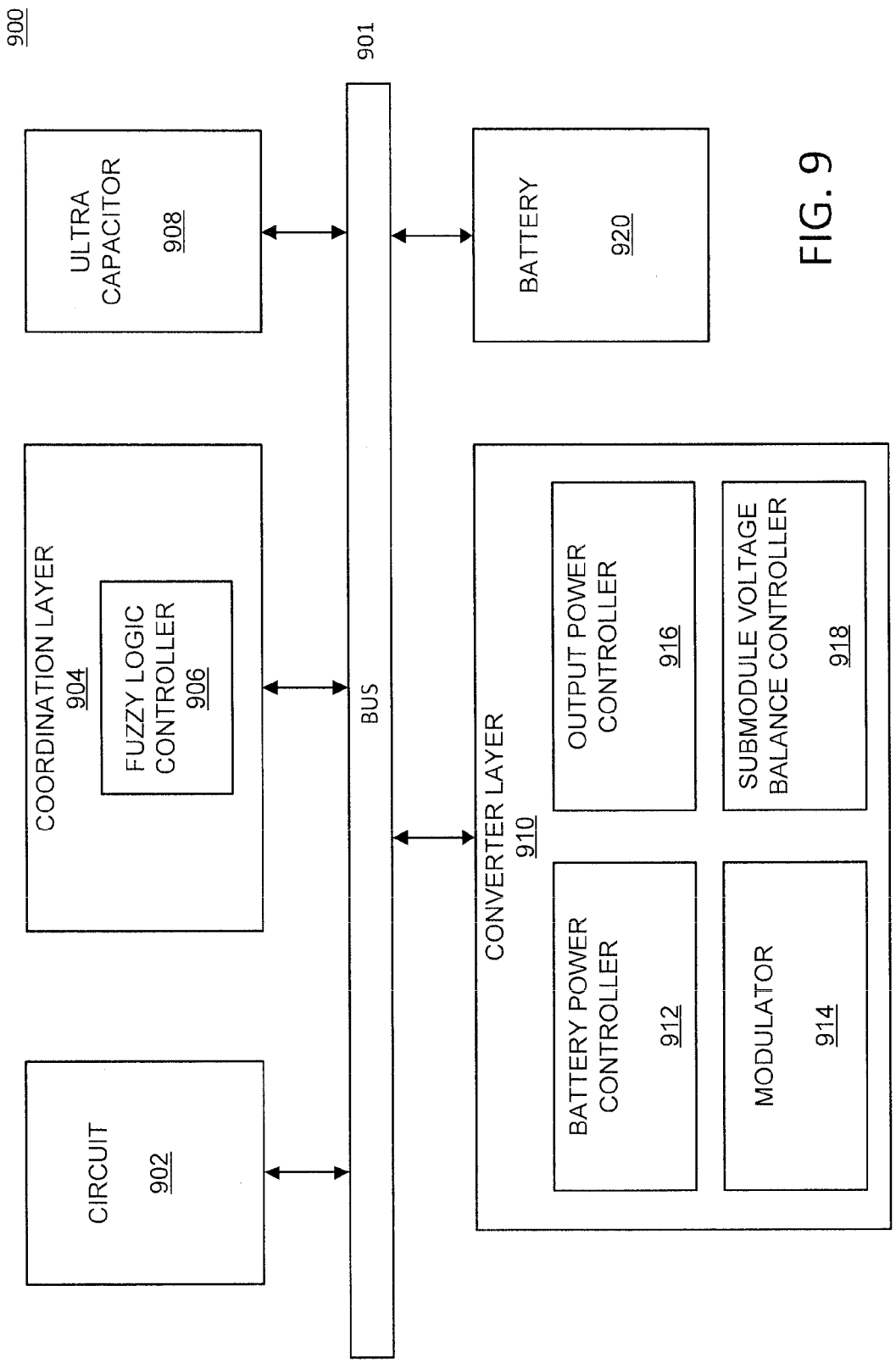
FIG. 9 shows an exemplary system for managing hybrid energy storage systems (HESSs) using a modular multilevel converter and control framework, in accordance with an embodiment of the present principles.

Referring now to FIG. 9, an exemplary system 900 for managing hybrid energy storage systems (HESSs) using a modular multilevel converter and control framework is illustratively depicted in accordance with an embodiment of the present principles.

While many aspects of system 900 are described in singular form for the sakes of illustration and clarity, the same can be applied to multiples ones of the items mentioned with respect to the description of system 900. For example, while a single, battery 920 may be mentioned with respect to a HESS, more than one battery 920 can be used in accordance with the teachings of the present principles, while maintaining the spirit of the present principles. Moreover, it is appreciated that battery 920 is but one aspect involved with system 900 than can be extended to plural form while maintaining the spirit of the present principles.

In one embodiment, the system 900 may include a plurality of components, which may include one or more circuits 902, UltraCapacitors 908, batteries 920, a coordination layer 904 including a fuzzy logic controller 906, and a converter layer 910 including a battery power controller 912, an output power controller 916, a modulator 914, and/or a sub-module voltage balance controller 918. The above components may be connected by, for example, a bus 901 according to some embodiments of the present principles.

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Compared to conventional HESS technologies, the MMC 200 of the present embodiments has several advantages. Direct DC/AC conversion is realized, so overall system efficiency can be increased. The MMC 200 eliminates a DC inductor and greatly shrinks the size of a DC-link capacitor, reducing the cost of DC-side passive components. The MMC is also scalable to mega-voltage and mega-watt applications, making it suitable for grid energy storage, and furthermore provides an easy and low-cost way to add redundancy and increase the reliability of the system. The multilevel output waveform decreases the total harmonic distortion, shrinks the size of the output filter, and increases system efficiency by reducing switching frequency.

Furthermore, the employment of a half bridge in the SMs 204 in the MMC 200 in some embodiments may reduce the number of passive components (e.g., resistors, capacitors, etc.), thereby increasing the efficiency of the system. The converter layer controller 600 enables use of the half bridge by independently controlling the power from the battery and the UC in the SMs 204. The fuzzy logic controller 402 further improves performance by intelligently distributing power between the battery and the UC in the SMs 204 so that the battery performance is maximized (e.g., increased battery performance) while also extending the life of the battery (e.g., by reducing the charge and discharge cycles) in various embodiments of the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A modular multilevel converter for hybrid energy storage, comprising:

three phases connectable in series to a battery and in parallel to one another, each phase comprising at least two arms of sub-modules and buffer inductors, wherein each of the sub-modules comprises a half-bridge and an ultracapacitor; and a two layer controller, including a coordination layer and a converter layer, wherein the two layer controller independently controls battery output power and ultracapacitor output power, and distributes a power load between the battery and the ultracapacitor to optimize the performance of a hybrid energy storage system, wherein the converter layer of the two layer controller comprises a high level control configured to determine a number of sub-modules to be inserted in respective upper and lower arms of a phase in the modular multilevel converter, and a low level control configured to balance sub-modules voltage and generate gate signals;

wherein the high level control comprises an output power control configured to regulate the actual output power to follow a reference output power, a battery power control configured to regulate the actual battery power to follow a reference battery power, and a modulator configured to generate a number of sub-modules in a respective upper and lower arm, and wherein the output power control is configured to sense and convert the three-phase voltage $e_v$ from abc into dq0 coordinates, to obtain a 'd' axis component of a three-phase output current reference $I_d$ by dividing the reference output power $P_{out}$ by a 'd' axis component of the three-phase voltage $e_d$, to sense and convert a three-phase current $i_{abc}$ from abc into dq0 coordinates, to obtain an error current signal $i_{d\_err}$ by subtracting a 'd' axis component of the sensed three-phase output current $i_d$ from the current reference $I_d$, and to obtain an output-power-related voltage reference $V_{ref\_out}$ by sending the error current signal $i_{d\_err}$ through a proportional-integral controller and then a dq/abc converter.

2. The modular multilevel converter of claim 1, wherein each sub-module is configured such that the ultracapacitor is connected across two semiconductor switches.

3. The modular multilevel converter of claim 1, wherein the sub-modules in each arm are arranged serially.

4. The modular multilevel converter of claim 1, wherein the coordination layer includes a fuzzy logic controller for determining and controlling the power load between the battery and the ultracapacitor.

5. The modular multilevel converter of claim 4, wherein the fuzzy logic controller intelligently distributes power between the battery and the ultracapacitor such that the battery outputs baseline power with a pre-calculated/user-defined dynamic low peak value, and the ultracapacitor outputs fluctuating power with a pre-calculated/user-defined dynamic high peak value.

6. The modular multilevel converter of claim 1, wherein the battery power control is configured to divide the reference battery power $$\frac{P_{batt}}{3}$$

by a DC bus voltage $V_{DC}$ to obtain a circulating current reference $I_{circ}$, to calculate an circulating current $i_{circ}$ by adding an upper arm current $i_p$ and a lower arm current $i_N$, and then dividing the sum thereof by two, to obtain an error current signal $i_{circ\_err}$ by subtracting the actual circulating current $i_{circ}$ from the circulating current reference $I_{circ}$, and to obtain a battery-power-related voltage reference $V_{ref\_batt}$ by sending the error current signal $i_{circ\_err}$ through a proportional-integral controller.

7. The modular multilevel converter of claim 1, wherein the low level control is configured to determine whether a current in each respective arm is greater than zero, to select sub-modules to engage for each arm based on ultracapacitor voltages for each sub-module in the respective arm in accordance with the determination of whether the current in the respective arm is greater than zero, and to generate gate signals to engage the selected sub-modules.

8. The modular multilevel converter of claim 7, wherein the low level control is further configured to select $n_P$ sub-modules in the upper arm having lowest ultracapacitor voltages if the upper arm current is greater than zero, to select $n_P$ sub-modules in the upper arm having highest ultracapacitor voltages if the upper arm current is less than zero, to select $n_N$ sub-modules in the lower arm having lowest ultracapacitor voltages if the lower arm current is greater than zero, and to select $n_N$ sub-modules in the lower arm having highest ultracapacitor voltages if the lower arm current is less than zero.

9. The modular multilevel converter of claim 7, wherein the low level control is configured to generate gate signals by supplying a gate voltage to two semiconductor switches in a half-bridge configuration of the sub-modules.

10. A method for controlling a modular multilevel converter based hybrid energy storage system, comprising:
determining a number of sub-modules to be inserted in a respective upper and lower arm of a phase in the modular multilevel converter;
determining whether a current in each respective arm is greater than zero;
selecting sub-modules to engage for each arm based on ultracapacitor voltages for each sub-module in the respective arm in accordance with the determination of whether the current in the respective arm is greater than zero;
generating gate signals to engage the selected sub-modules; and
distributing power based on the gate signals using a two layer controller including a coordination layer and a converter layer, wherein the two layer controller independently controls battery output power and ultracapacitor output power, and distributes a power load between a battery and an ultracapacitor to optimize the performance of the hybrid energy storage system,
wherein the converter layer comprises a high level control configured to determine a number of sub-modules to be inserted in respective upper and lower arms of a phase in the modular multilevel converter, and a low level control configured to balance sub-modules voltage and generate gate signals;
wherein the high level control comprises an output power control configured to regulate actual output power to follow a reference output power, a battery power control configured to regulate the actual battery power to follow a reference battery power, and a modulator configured to generate a number of sub-modules in a respective upper and lower arm, and
wherein the output power control is configured to sense and convert a three-phase voltage $e_v$ from abc into dq0 coordinates, to obtain a 'd' axis component of a three-phase output current reference $I_d$ by dividing the reference output power $P_{out}$ by a 'd' axis component of the three-phase voltage $e_d$, to sense and convert a three-phase current $i_{abc}$ from abc into dq0 coordinates, to obtain an error current signal $i_{d\_err}$ by subtracting a 'd' axis component of the sensed three-phase output current $i_d$ from the current reference $I_d$, and to obtain an output-power-related voltage reference $V_{ref\_out}$ by sending the error current signal $i_{d\_err}$ through a proportional-integral controller and then a dq/abc converter.

11. The method of claim 10, wherein the coordination layer includes a fuzzy logic controller for determining and controlling the power load between the battery and the ultracapacitor.

12. The method of claim 11, wherein the fuzzy logic controller intelligently distributes power between the battery and the ultracapacitor such that the battery outputs baseline power with a pre-calculated/user-defined dynamic low peak value, and the ultracapacitor outputs fluctuating power with a pre-calculated/user-defined dynamic high peak value.

13. The method of claim 10, wherein determining the number of sub-modules to be inserted in a respective upper and lower arm of a phase comprises:
regulating an actual output power to follow a reference output power;
regulating an actual battery power to follow a reference battery power; and
generating the number of sub-modules in a respective upper and lower arm.

14. The method of claim 11, wherein regulating the actual battery power comprises:
dividing the reference battery power $$\frac{P_{batt}}{3}$$

by a DC bus voltage $V_{DC}$ to obtain a circulating current reference;

calculating an circulating current by adding an upper arm current $i_P$ and a lower arm current $i_N$, and then dividing the sum thereof by two;

obtaining an error current signal by subtracting the actual circulating current from the circulating current reference; and obtaining a battery-power-related voltage reference by sending the error current signal through a proportional-integral controller.

15. The method of claim 11, wherein the sub-modules includes $n_P$ and $n_N$, which are determined based on an output-power-related voltage reference, a battery-power-related voltage reference, an upper arm ultracapacitor voltage $v_{CP}$, and a lower arm ultracapacitor voltage $v_{CN}$.

16. The method of claim 10, wherein selecting the sub-modules comprises:

selecting $n_P$ sub-modules in the upper arm having the lowest ultracapacitor voltage if the upper arm current is greater than zero;

selecting $n_P$ sub-modules in the upper arm having the highest ultracapacitor voltage if the upper arm current is less than zero;

selecting $n_N$ sub-modules in the lower arm having the lowest ultracapacitor voltage if the lower arm current is greater than zero; and selecting $n_N$ sub-modules in the lower arm having the highest ultracapacitor voltage if the lower arm current is less than zero.

17. The method of claim 10, wherein each sub-module is configured such that the ultracapacitor is connected across two semiconductor switches.

\* \* \* \* \*